(12) United States Patent
Jang et al.

(10) Patent No.: US 12,551,042 B2
(45) Date of Patent: Feb. 17, 2026

(54) THERMOELECTRIC FOOD PREPARATION ZONE CONTROL

(71) Applicant: Samsung Electronics Co., Ltd., Suwon-si (KR)

(72) Inventors: Kyung Jang, Anderson, SC (US); Raveendran Vaidhyanathan, Rockaway, NJ (US); Sungho Yoon, Suwon-si (KR); Kyounghoon Lee, Suwon-si (KR); Insub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 18/545,936

(22) Filed: Dec. 19, 2023

(65) Prior Publication Data
US 2025/0194835 A1 Jun. 19, 2025

(51) Int. Cl.
 *F25B 21/04* (2006.01)
 *A47G 23/06* (2006.01)
 *A47J 36/24* (2006.01)

(52) U.S. Cl.
 CPC ...... *A47G 23/0683* (2013.01); *A47J 36/2483* (2013.01); *F25B 21/04* (2013.01)

(58) Field of Classification Search
 CPC .. A47G 23/0683; A47J 36/2483; F25B 21/04; F25B 2321/0251; F25B 2321/0252; F01D 25/002
 See application file for complete search history.

(56) References Cited

U.S. PATENT DOCUMENTS

| | | | | |
|---|---|---|---|---|
| 5,722,254 | A * | 3/1998 | Roth | F25D 11/00 62/453 |
| 6,295,820 | B1 * | 10/2001 | Cauchy | F25D 17/06 62/3.6 |
| 8,759,721 | B1 * | 6/2014 | Alexander | A47J 36/321 165/61 |
| 9,493,102 | B2 * | 11/2016 | Tang | F25B 21/02 |
| 9,581,362 | B2 * | 2/2017 | Stanley | H02M 7/23 |
| 9,713,798 | B2 * | 7/2017 | Hewitt | B65D 47/32 |
| 10,161,657 | B2 * | 12/2018 | Ilercil | F25B 21/04 |
| 10,743,708 | B2 | 8/2020 | Alexander et al. | |
| 11,000,157 | B2 * | 5/2021 | Bassill | A47J 36/2483 |
| 11,549,730 | B2 | 1/2023 | Born et al. | |

(Continued)

FOREIGN PATENT DOCUMENTS

| KR | 1020180080022 A | 7/2018 |
|---|---|---|
| WO | 2004005809 A1 | 1/2004 |

*Primary Examiner* — Filip Zec

(57) ABSTRACT

An apparatus includes first and second platforms, a stem, and a fluid transfer path. The first platform includes a first serving surface and one or more first thermoelectric modules with one or more supply sides facing the first serving surface. The second platform includes a second serving surface and one or more second thermoelectric modules with one or more supply sides facing the second serving surface. The stem extends from the first serving surface of the first platform to a bottom surface of the second platform. The fluid transfer path is configured to guide a fluid and includes a first flow path inside the first platform, a second flow path inside the second platform, and third and fourth flow paths inside the stem and extending between the first flow path and the second flow path.

20 Claims, 5 Drawing Sheets

(56) References Cited

U.S. PATENT DOCUMENTS

| | | | | |
|---|---|---|---|---|
| 11,668,508 | B2* | 6/2023 | Alexander | F25B 21/02 |
| | | | | 62/3.6 |
| 2004/0094192 | A1 | 5/2004 | Luo | |
| 2006/0174634 | A1* | 8/2006 | Hsu | F04D 29/582 |
| | | | | 62/426 |
| 2006/0277924 | A1* | 12/2006 | Platkin | F25B 21/04 |
| | | | | 62/3.3 |
| 2007/0204629 | A1* | 9/2007 | Lofy | F25B 21/04 |
| | | | | 62/3.61 |
| 2007/0226891 | A1* | 10/2007 | Pflueger | F25B 21/02 |
| | | | | 4/541.1 |
| 2009/0049845 | A1* | 2/2009 | McStravick | A61M 5/003 |
| | | | | 62/3.62 |
| 2009/0282860 | A1* | 11/2009 | Shaw | A47G 23/0683 |
| | | | | 206/557 |
| 2020/0189826 | A1* | 6/2020 | Alexander | A47J 36/2483 |
| 2021/0144960 | A1* | 5/2021 | Taneja | A01K 7/027 |
| 2021/0387557 | A1* | 12/2021 | Himmelreich | F25D 17/06 |
| 2021/0389039 | A1* | 12/2021 | Hutchins | F25D 3/08 |

* cited by examiner

THERMOELECTRIC FOOD PREPARATION ZONE CONTROL

TECHNICAL FIELD

This disclosure relates generally to serving tray devices and processes. More specifically, this disclosure relates to thermoelectric food preparation zone control.

BACKGROUND

Various serving trays have been developed that provide heating to keep food warm, cooling to keep food cold, or both. Serving trays that provide heating often utilize heating elements like radiant heating (such as light bulbs), chafing dishes, or other heat sources. Serving trays that provide cooling often utilize cooling systems like evaporators, fans, condensers, and compressors, which can take up large amounts of space. Serving trays that provide cooling and heating often utilize vapor compression and radiant heat packages, which are separate subsystems and cumbersome. If a serving tray uses an air temperature-controlled environment, some form of walls or confined space with solid barriers similar to a cabinet of a refrigerator may be needed.

SUMMARY

This disclosure relates to thermoelectric food preparation zone control.

In a first embodiment, an apparatus includes a first platform, a second platform, a stem, and a fluid transfer path. The first platform includes a first serving surface and one or more first thermoelectric modules with one or more supply sides facing the first serving surface. The second platform includes a second serving surface and one or more second thermoelectric modules with one or more supply sides facing the second serving surface. The stem extends from the first serving surface of the first platform to a bottom surface of the second platform. The fluid transfer path is configured to guide a fluid and includes a first flow path inside the first platform and a second flow path inside the second platform. The fluid transfer path also includes a third flow path inside the stem and extending between an outlet of the first flow path and an inlet of the second flow path. The fluid transfer path further includes a fourth flow path inside the stem extending between an outlet of the second flow path and an inlet of the first flow path.

In a second embodiment, a method includes activating one or more first thermoelectric modules in or on a first platform of a serving tray, where one or more supply sides of the one or more first thermoelectric modules face a first serving surface of the first platform. The method also includes activating one or more second thermoelectric modules in or on a second platform of the serving tray, where one or more supply sides of the one or more second thermoelectric modules face a second serving surface of the second platform. A stem extends from the first serving surface of the first platform to a bottom surface of the second platform. The method further includes guiding a fluid through a fluid transfer path. The fluid transfer path includes a first flow path inside the first platform and a second flow path inside the second platform. The fluid transfer path also includes a third flow path inside the stem and extending between an outlet of the first flow path and an inlet of the second flow path. The fluid transfer path further includes a fourth flow path inside the stem extending between an outlet of the second flow path and an inlet of the first flow path.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Terms and phrases such as "have," "may have," "include," or "may include" a feature (like a number, function, operation, or component such as a part) indicate the existence of the feature and do not exclude the existence of other features. Also, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, the terms "first" and "second" may modify various components regardless of importance and do not limit the components. These terms are only used to distinguish one component from another. For example, a first device and a second device may indicate different devices from each other, regardless of the order or importance of the devices. A first component may be denoted a second component and vice versa without departing from the scope of this disclosure.

It will be understood that, when an element (such as a first element) is referred to as being "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

The phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
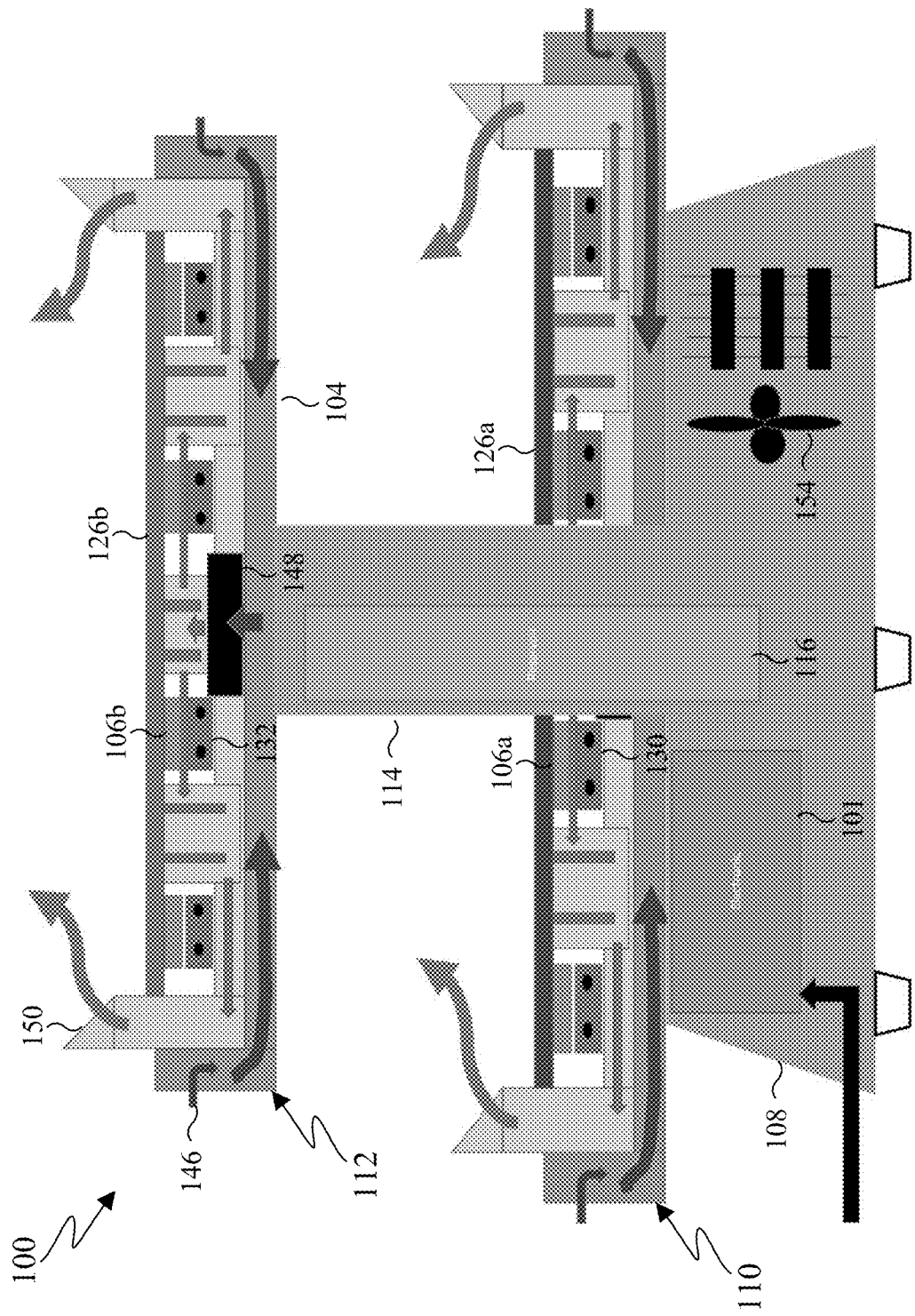
FIGS. 1A through 1D illustrate an example serving tray in accordance with this disclosure.
Figure 1B:
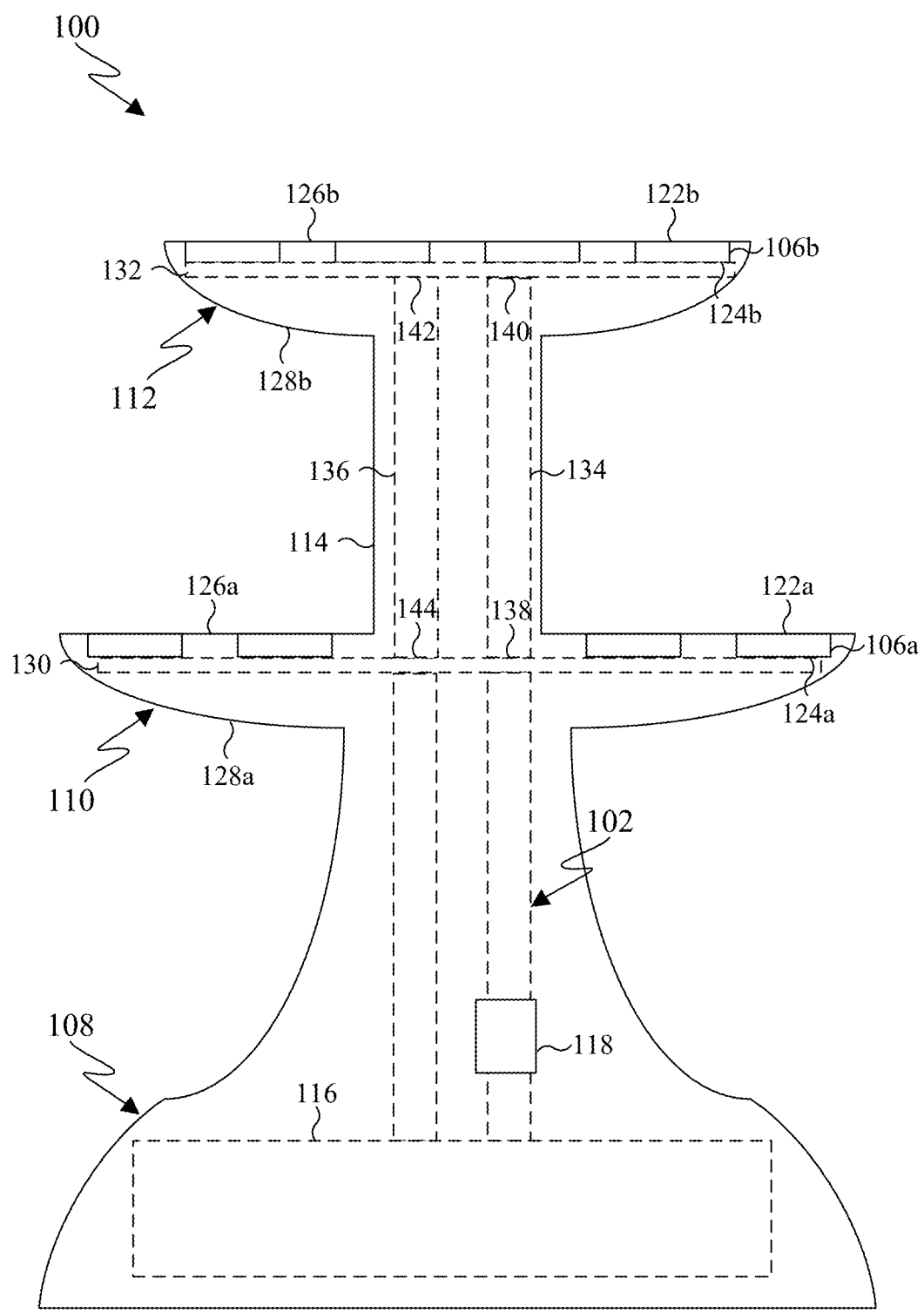
Figure 1C:
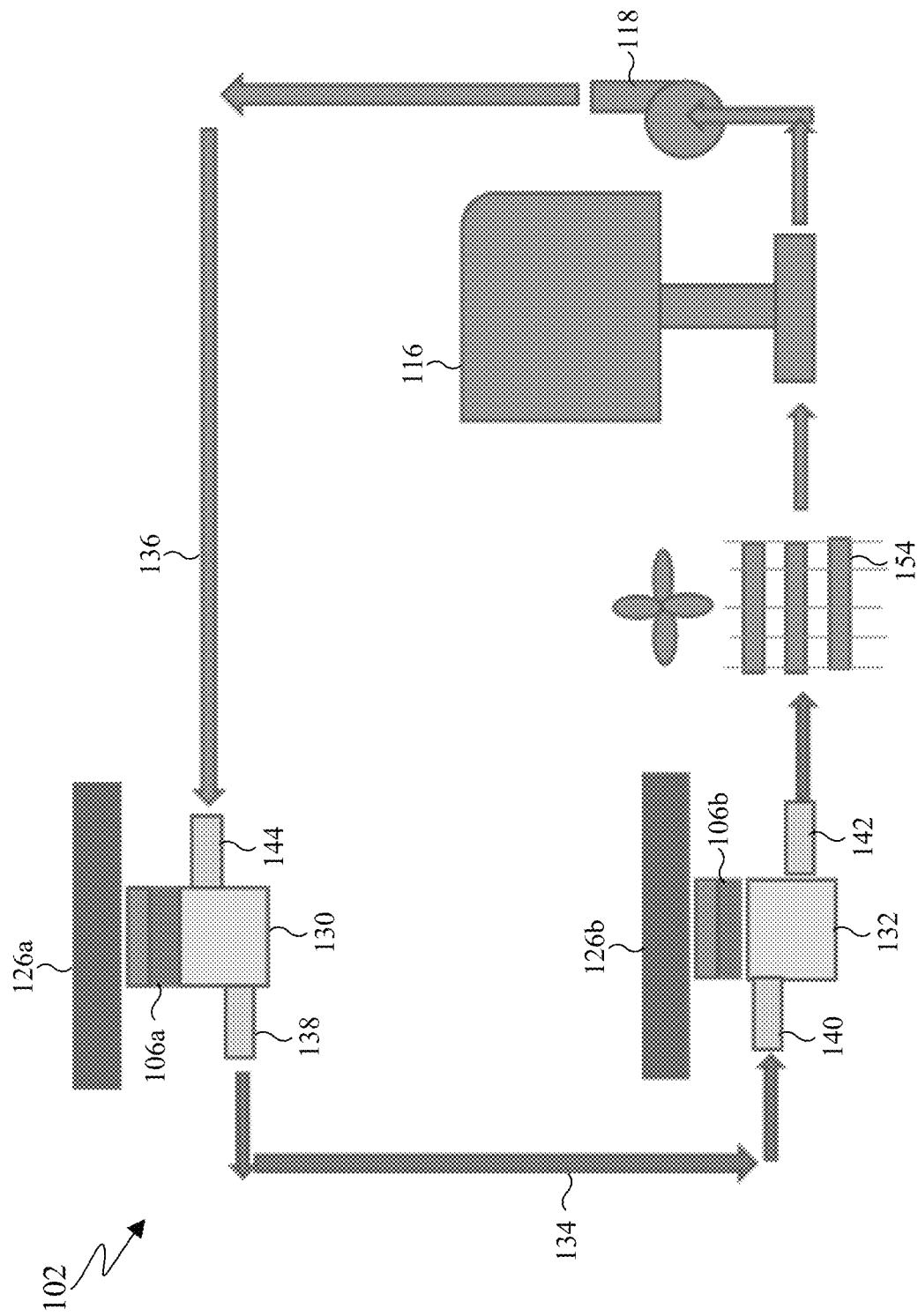
Figure 1D:
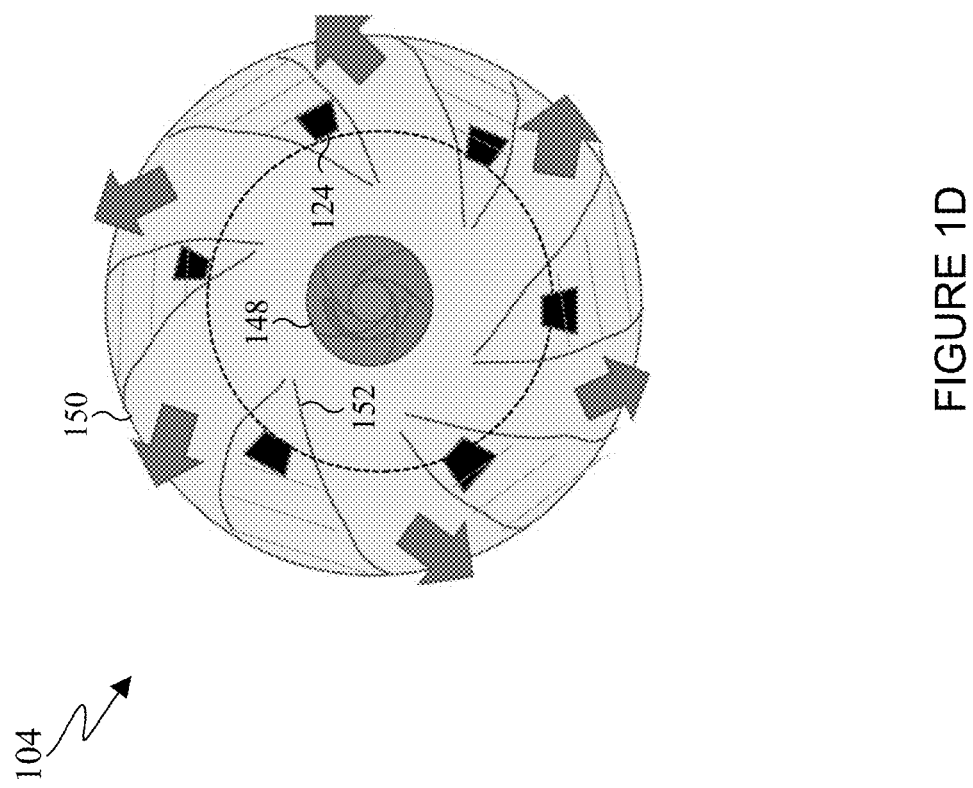
Figure 2:
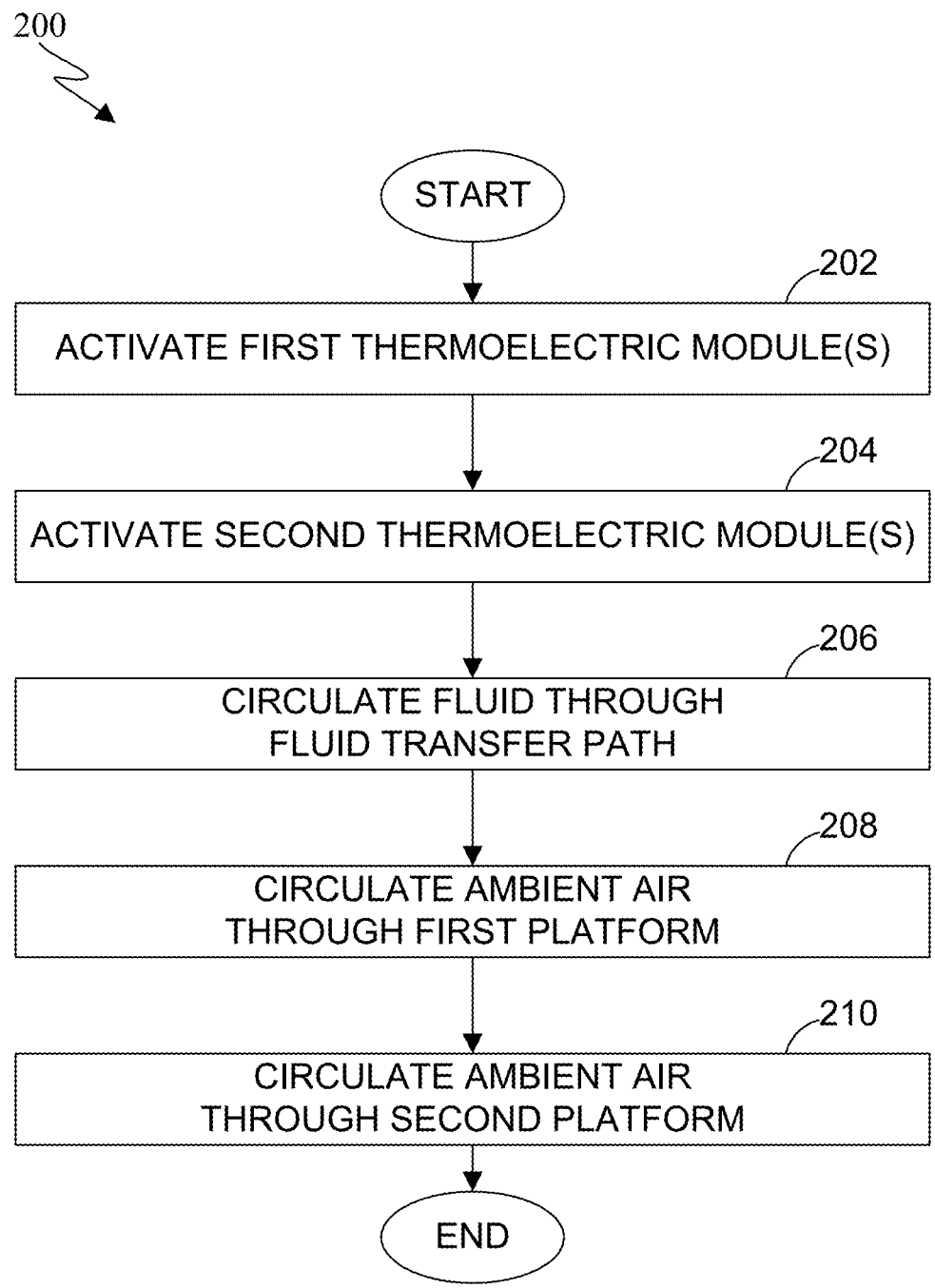
FIG. 2 illustrates an example method for thermoelectric food preparation zone control according to this disclosure.

FIGS. 1A through 2, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, various serving trays have been developed that provide heating to keep food warm, cooling to keep food cold, or both. Serving trays that provide heating often utilize heating elements like radiant heating (such as light bulbs), chafing dishes, or other heat sources. Serving trays that provide cooling often utilize cooling systems like evaporators, fans, condensers, and compressors, which can take up large amounts of space. Serving trays that provide cooling and heating often utilize vapor compression and radiant heat packages, which are separate subsystems and cumbersome. If a serving tray uses an air temperature-controlled environment, some form of walls or confined space with solid barriers similar to a cabinet of a refrigerator may be needed.

This disclosure provides for thermoelectric food preparation zone control. As described in more detail below, a serving tray includes a first platform having a first serving surface and one or more first thermoelectric modules with one or more supply sides facing the first serving surface. The serving tray also includes a second platform having a second serving surface and one or more second thermoelectric modules with one or more supply sides facing the second serving surface. A stem extends from the first serving surface of the first platform to a bottom surface of the second platform. A fluid transfer path guides a fluid and includes a first flow path inside the first platform, a second flow path inside the second platform, a third flow path inside the stem and extending between an outlet of the first flow path and an inlet of the second flow path, and a fourth flow path inside the stem extending between an outlet of the second flow path and an inlet of the first flow path. Thermoelectric modules are light and can provide both cooling and heating using a direct current (DC) electric power input. Depending on the implementation, the serving tray may use a combination of a secondary liquid cooling loop, cold/hot plates, air curtain circuits to control two-tiered air zone spaces, and efficient Peltier thermoelectric module sets.

FIGS. 1A through 1D illustrate an example serving tray 100 in accordance with this disclosure. In particular, FIG. 1A illustrates an example serving tray 100, FIG. 1B illustrates an example fluid transfer path 102 within the serving tray 100, FIG. 1C illustrates an example flow of fluid in the fluid transfer path 102 of the serving tray 100, and FIG. 1D illustrates an example air duct 104 in the serving tray 100.

As shown in FIGS. 1A and 1B, the serving tray 100 can be used to maintain foods at one or more suitable serving temperatures (such as one or more warmer or colder temperatures), and these temperatures may differ from each other. In this example, the serving tray 100 includes a fluid transfer path 102, an air duct 104, thermoelectric modules 106a-106b, a base 108, a first platform 110, a second platform 112, a stem 114, a reservoir 116, a fluid pump 118, and electronics 101. Note that while the serving tray 100 here is illustrated as having two platforms 110 and 112 and a single stem 114, the serving tray 100 can include additional platforms with a stem between adjacent platforms. The serving tray 100 can provide warmer or colder foods for extended periods of time without reaching room temperature.

The base 108 represents a lower portion of the serving tray 100. For example, the base 108 can include a generally flat bottom surface that can be positioned on a table or other support. The base 108 can also help to support higher components of the serving tray 100. The base 108 can be formed using any suitable material or materials, possibly one or more materials with a high heat transfer coefficient. In some embodiments, the base 108 can be formed using at least one metal. In some embodiments, the base 108 itself may include a platform for serving food (such as the first platform 110 or an additional platform), possibly along with one or more thermoelectric modules.

The first platform 110 represents a first structure for holding food to be warmed or cooled. In this example, the first platform 110 includes a serving or top surface 126a and a bottom surface 128a. The top surface 126a of the first platform 110 can receive or hold food to be warmed or cooled. The bottom surface 128a of the first platform 110 can be coupled to or integral with the base 108. In some cases, the bottom surface 128a of the first platform 110 can include a pattern or texture that can enhance the aesthetic of the first platform 110 or increase the exposed surface area for greater heat transfer to ambient air. The top surface 126a of the first platform 110 may be formed using one or more materials having a high heat transfer coefficient, which may help to maintain a substantially uniform temperature of food. The top surface 126a can also be formed using at least one food grade material in order to receive food. For example, the top surface 126a may be formed using at least one metal. The bottom surface 128a may or may not be formed using a food grade material. In some embodiments, the top surface 126a can be generally flat.

The stem 114 is connected to or integral with the top surface 126a of the first platform 110, such as at a center of the top surface 126a of the first platform 110. The stem 114 extends upward towards the second platform 112, such as in a direction perpendicular to the top surface 126a of the first platform 110. The length of the stem 114 can be selected to provide suitable clearance for viewing and accessing food placed on the first platform 110. The stem 114 can be formed using any suitable material or materials and may or may not be formed using the same material(s) as the first platform 110. In some embodiments, the stem 114 can be formed using at least one metal. The stem 114 may include a pattern or texture on an exterior surface that can enhance the aesthetic of the serving tray 100 or increase the exposed surface area for greater heat transfer to ambient air.

The second platform 112 represents a second structure for holding food to be warmed or cooled. In this example, the second platform 112 includes a serving or top surface 126b and a bottom surface 128b. The top surface 126b of the second platform 112 can receive or hold food to be warmed or cooled. The bottom surface 128b of the second platform 112 can be coupled to or integral with the stem 114, such as at a center of the bottom surface 128b of the second platform 112. In some cases, the bottom surface 128b of the second platform 112 can include a pattern or texture that can enhance the aesthetic of the second platform 112 or increase the exposed surface area for greater heat transfer to ambient air. The top surface 126b of the second platform 112 may be formed using one or more materials having a high heat transfer coefficient, which may help to maintain a substantially uniform temperature of food. The top surface 126b can also be formed using at least one food grade material in order to receive food. For example, the top surface 126b may be formed using at least one metal. The bottom surface 128b may or may not be formed using a food grade material. In some embodiments, the top surface 126b can be generally flat.

The first platform 110 also includes at least one thermoelectric module 106a, where each thermoelectric module 106a has a supply side 122a and a waste side 124a. Supplying power to each thermoelectric module 106a can control a flow of heat from the supply side 122a to the waste side 124a of the thermoelectric module 106a (for cooling) or a flow of heat from the waste side 124a to the supply side 122a (for heating). In this example, the supply side 122a of each thermoelectric module 106a is oriented towards the top surface 126a of the first platform 110. The heating or cooling from the supply side 122a of each thermoelectric module 106a can be transferred across the top surface 126a of the first platform 110 to any food placed on the top surface 126a.

When multiple thermoelectric modules 106a are utilized in or with the first platform 110, the thermoelectric modules 106a may be wired in some embodiments to operate in unison in order to heat or cool the top surface 126a of the first platform 110. In other embodiments, control of the thermoelectric modules 106a can be divided, such as for different portions of the top surface 126a (like halves or quadrants), and each section of thermoelectric modules 106a can be controlled separately for different heating and/or cooling functions. The different sections can also be set to different temperatures. For example, some thermoelectric modules 106a may be used for cooling to a first temperature for fresh items, and other thermoelectric modules 106a may be used for cooling to a second temperature for frozen items. As another example, some thermoelectric modules 106a may be used for heating to a first temperature for one type of food (such as chicken), and other thermoelectric modules 106a may be used for heating to a second temperature for another type of food (such as beef).

The second platform 112 also includes at least one thermoelectric module 106b, where each thermoelectric module 106b has a supply side 122b and a waste side 124b. Again, supplying power to each thermoelectric module 106b can control a flow of heat from the supply side 122b to the waste side 124b of the thermoelectric module 106b (for cooling) or a flow of heat from the waste side 124b to the supply side 122b (for heating). In this example, the supply side 122b of each thermoelectric module 106b is oriented towards the top surface 126b of the second platform 112. The heating or cooling from the supply side 122b of each thermoelectric module 106b can be transferred across the top surface 126b of the second platform 112 to any food placed on the top surface 126b.

When multiple thermoelectric modules 106b are utilized in or with the second platform 112, the thermoelectric modules 106b may be wired in some embodiments to operate in unison in order to heat or cool the top surface 126b of the second platform 112. In other embodiments, control of the thermoelectric modules 106b can be divided, such as for different portions of the top surface 126b (like halves or quadrants), and each section of thermoelectric modules 106b can be controlled separately for different heating and/or cooling functions. The different sections can also be set to different temperatures. For example, some thermoelectric modules 106b may be used for cooling to a second temperature for fresh items, and other thermoelectric modules 106b may be used for cooling to a second temperature for frozen items. As another example, some thermoelectric modules 106b may be used for heating to a second temperature for one type of food (such as chicken), and other thermoelectric modules 106b may be used for heating to a second temperature for another type of food (such as beef).

In some embodiments, power can be provided to the thermoelectric modules 106a and 106b separately in order to provide different heating and/or cooling effects. For example, the top surface 126a of the first platform 110 may be heated, and the top surface 126b of the second platform 112 may be cooled (or vice versa). In some embodiments, the effect provided by the thermoelectric module(s) 106a can be the opposite of the effect provided by the thermoelectric module(s) 106b.

As shown in FIGS. 1B and 1C, the fluid transfer path 102 can guide a fluid through the serving tray 100 in order to transfer heat within the serving tray 100. In this example, the fluid transfer path 102 includes at least one first flow path 130 positioned inside the first platform 110, at least one second flow path 132 positioned inside the second platform 112, and at least one third flow path 134 and at least one fourth flow path 136 positioned within the stem 114. The at least one third flow path 134 extends between one or more outlets 138 of the first flow path(s) 130 and one or more inlets 140 of the second flow path(s) 132. The at least one fourth flow path 136 extends between one or more outlets 142 of the second flow path(s) 132 and one or more inlets 144 of the first flow path(s) 130.

In this example, the at least one first flow path 130 extends along the waste side(s) 124a of the thermoelectric module(s) 106a, and the at least one second flow path 132 extends along the waste side(s) 124b of the thermoelectric module(s) 106b. In order to not interfere with the heating or cooling of the top surfaces 126a and 126b of the first and second platforms 110 and 112, the heating and cooling on the waste sides 124a and 124b of the thermoelectric modules 106a and 106b are transferred to the fluid in the fluid transfer path 102. Thus, for instance, the circulation of the fluid in the fluid transfer path 102 may draw heat from one of the two platforms 110 and 112 cooling food and transfer the heat to the other of the two platforms 110 and 112 heating food. The transfer of heat allows for the thermoelectric modules 106a and 106b to operate at a higher efficiencies.

The fluid pump 118 is used to circulate fluid from the reservoir 116 through the fluid transfer path 102. In some embodiments, the fluid pump 118 can be positioned in the base 108 of the serving tray 100, although the fluid pump 118 may be located at any other suitable position. The reservoir 116, which can store fluid for the fluid transfer path 102, can be housed in the base 108 and the stem 114 or in other suitable location(s). For example, the reservoir 116 can store water or any other suitable fluid for heat transfer. Among other things, the reservoir 116 can reduce a temperature variance of the fluid in the fluid transfer path 102.

The serving tray 100 may optionally include a condenser fan 154. The condenser fan 154 may be positioned along the fluid transfer path 102 in the serving tray 100. The condenser fan 154 allows for the thermoelectric modules 106a-106b to both operate in cooling mode and in heating mode by increasing heat transfer to the ambient air through the fluid transfer path 102. In some embodiments, the condenser fan 154 can be formed using a fan and a heat sink.

As shown in FIGS. 1A and 1D, the serving tray 100 may optionally include at least one air duct 104 through each of the first and second platforms 110 and 112. Each air duct 104 can include one or more air inlets 146, at least one circulation fan 148, and one or more air outlets 150. Each air duct 104 guides ambient air to circulate past one or more waste sides 124a-124b of one or more thermoelectric modules 106a-106b in a platform, which can be done to transfer heat as needed and increase the efficiency of the thermoelectric module(s). Each air duct 104 may also create an air barrier for the bottom surface 128a or 128b of the associated platform 110 or 112. Each inlet 146 allows ambient air to enter into an air duct 104. In some cases, each inlet 146 can be positioned along an outer edge of the platform 110 or 112 or the bottom surface 128a or 128b of the platform 110 or 112.

Each circulation fan 148 can circulate air through the associated air duct 104. In this example, the circulation fan 148 draws air through the inlet(s) 146 and outputs the air through the outlet(s) 150. In some embodiments, each circulation fan 148 can be a radial fan, which can push air through a backward curved diffuser 152 positioned around the radial fan. The backward curved diffuser 152 guides the air to each respective outlet 150. Each outlet 150 allows air that has been exposed to the waste side(s) 124a or 124b of the thermoelectric modules 106a or 106b to be dispersed to the ambient air. In some embodiments, the outlets 150 are oriented in a direction towards a center of the associated platform 110 or 112. Each outlet 150 may direct the exhausted air above and away from food so as to not negatively affect the desired heat transfer occurring from the supply sides 122a or 122b of the thermoelectric modules 106a or 106b to the top surface 126a or 126b.

As shown in FIG. 1A, the serving tray 100 may also include electronics 101 for controlling the different operations of the serving tray 100. For example, the electronics 101 may provide and regulate power to the thermoelectric modules 106a-106b, thereby controlling the heating or cooling provided by the thermoelectric modules 106a-106b. In some embodiments, the electronics 101 can control both an operating mode and a heating or cooling temperature of each thermoelectric module 106a-106b. The electronics 101 may also or alternatively control one or more of the fluid pump 118, the circulation fan 148, and the condenser fan 154. For instance, the electronics 101 may control the fluid pump 118, the circulation fan 148, and the condenser fan 154 to perform cooling while the thermoelectric modules 1061-106b are in operation. As a particular example, the electronics 101 may include one or more controls or a user interface for receiving user inputs.

Although FIGS. 1A through 1D illustrate one example of a serving tray 100, various changes may be made to FIGS. 1A through 1D. For example, the numbers and placements of various components of the serving tray 100, such as the number of platforms and the number of thermoelectric modules, can vary as needed or desired. Also, the serving tray 100 may be used in any suitable food serving process and is not limited to the specific processes described above. For instance, the serving tray 100 may be used to heat and/or cool any suitable types of food items.

FIG. 2 illustrates an example method 200 for thermoelectric food preparation zone control according to this disclosure. For ease of explanation, the method 200 of FIG. 2 is described as being performed using the serving tray 100 of FIG. 1. However, the method 200 may be used with any other suitable serving tray designed in accordance with this disclosure.

As shown in FIG. 2, the serving tray 100 can activate one or more first thermoelectric modules, such as one or more thermoelectric modules 106a, at step 202. For example, the serving tray 100 may control a current provided to each thermoelectric module 106a for operating in a heating or cooling mode. In a heating mode, the thermoelectric module(s) 106a can be provided power in a manner causing the supply side(s) 122a of the thermoelectric module(s) 106a to draw heat from the waste side(s) 124a of the thermoelectric module(s) 106a, and the supply side(s) 122a of the thermoelectric module(s) 106a can become warmer while the waste side(s) 124a of the thermoelectric module(s) 106a can become colder. In a cooling mode, the thermoelectric module(s) 106a can be provided power in a manner causing the waste side(s) 124a of the thermoelectric module(s) 106a to draw heat from the supply side(s) 122a of the thermoelectric modules 106a, and the supply side(s) 122a of the thermoelectric module(s) 106a can become colder while the waste side(s) 124a of the thermoelectric module(s) 106a can become warmer.

The serving tray 100 can activate one or more second thermoelectric modules, such as one or more thermoelectric modules 106b, at step 204. For example, the serving tray 100 may control a current provided to each thermoelectric module 106b for operating in a heating or cooling mode. In a heating mode, the thermoelectric module(s) 106b can be provided power in a manner causing the supply side(s) 122b of the thermoelectric module(s) 106b to draw heat from the waste side(s) 124b of the thermoelectric module(s) 106b, and the supply side(s) 122b of the thermoelectric module(s) 106b can become warmer while the waste side(s) 124b of the thermoelectric module(s) 106b can become colder. In a cooling mode, the thermoelectric module(s) 106b can be provided power in a manner causing the waste side(s) 124b of the thermoelectric module(s) 106b to draw heat from the supply side(s) 122b of the thermoelectric modules 106b, and the supply side(s) 122b of the thermoelectric module(s) 106b can become colder while the waste side(s) 124b of the thermoelectric module(s) 106b can become warmer.

Note that the first and second thermoelectric modules 106a and 106b can be operated in the heating and cooling modes independently from each other. For example, the thermoelectric module(s) 106a can be operated in a heating mode, while the second thermoelectric module(s) 106b can be operated in a cooling mode (or vice versa). Also, while the thermoelectric module(s) 106a may be operating in one mode, the second thermoelectric module(s) 106b can be switched from the cooling mode to the heating mode (or vice versa) without changing the operating mode of the thermoelectric module(s) 106a.

The serving tray 100 can circulate a fluid through a fluid transfer path 102 at step 206. For example, the serving tray 100 can control the fluid pump 118 to circulate the fluid through the fluid transfer path 102. The fluid circulating in the fluid transfer path 102 can pass across the waste sides 124a-124b of the first and second thermoelectric modules 106a-106b. When a thermoelectric module 106a or 106b is operating in a heating mode, the fluid transfers heat to the waste side 124a or 124b of the thermoelectric module 106a or 106b. When a thermoelectric module 106a or 106b is operating in a cooling mode, the fluid draws heat from the waste side 124a or 124b of the thermoelectric module 106a or 106b.

The serving tray 100 can circulate ambient air through the first platform 110 at step 208. For example, the serving tray 100 can control a first circulation fan 148 in an air duct 104 of the first platform 110. The first circulation fan 148 can circulate ambient air from one or more inlets 146 through the air duct 104 to one or more outlets 150. The air can be guided past the waste side(s) 124a of the thermoelectric module(s) 106a. The ambient air may increase the heat transfer with the waste side(s) 124a of the first thermoelectric module(s) 106a. The circulated air may also provide an air cushion for the bottom surface 128a of the first platform 110.

The serving tray 100 can circulate ambient air through the second platform 112 at step 210. For example, the serving tray 100 can control a second circulation fan 148 in an air duct 104 of the second platform 112. The second circulation fan 148 can circulate ambient air from one or more inlets 146 through the air duct 104 to one or more outlets 150. The air can be guided past the waste side(s) 124b of the thermoelectric module(s) 106b. The ambient air may increase the heat transfer with the waste side(s) 124b of the second thermoelectric module(s) 106b. The circulated air may also provide an air cushion for the bottom surface 128b of the second platform 112.

Although FIG. 2 illustrates one example of a method 200 for thermoelectric food preparation zone control, various changes may be made to FIG. 2. For example, while shown as a series of steps, various steps in FIG. 2 may overlap, occur in parallel, occur in a different order, or occur any number of times (including zero times).

Although this disclosure has been described with example embodiments, various changes and modifications may be suggested to one skilled in the art. It is intended that this disclosure encompass such changes and modifications as fall within the scope of the appended claims.

What is claimed is:

1. A serving tray comprising:
   a first platform comprising a first serving surface and one or more first thermoelectric modules with one or more supply sides facing the first serving surface;
   a second platform comprising a second serving surface and one or more second thermoelectric modules with one or more supply sides facing the second serving surface;
   a stem extending from the first serving surface of the first platform to a bottom surface of the second platform; and
   a fluid transfer path configured to guide a fluid and comprising:
      a first flow path inside the first platform;
      a second flow path inside the second platform;
      a third flow path inside the stem and extending between an outlet of the first flow path and an inlet of the second flow path; and
      a fourth flow path inside the stem extending between an outlet of the second flow path and an inlet of the first flow path.

2. The serving tray of claim 1, further comprising:
   a fluid pump configured to circulate the fluid in the fluid transfer path.

3. The serving tray of claim 1, wherein the one or more supply sides of the one or more first thermoelectric modules thermally contact the first serving surface and one or more waste sides of the one or more first thermoelectric modules thermally contact the first flow path.

4. The serving tray of claim 3, wherein the one or more supply sides of the one or more second thermoelectric modules thermally contact the second serving surface and one or more waste sides of the one or more second thermoelectric modules thermally contact the second flow path.

5. The serving tray of claim 1, wherein the first platform further comprises an air duct positioned around the first flow path.

6. The serving tray of claim 5, where the air duct comprises a radial fan to circulate external air through the air duct.

7. The serving tray of claim 6, wherein the air duct comprises a backward curve diffuser positioned around the radial fan.

8. The serving tray of claim 1, wherein the fluid transfer path further comprises a reservoir configured to reduce a temperature variance within the fluid in the fluid transfer path.

9. The serving tray of claim 8, wherein the fluid transfer path further comprises a radiator configured to cool the fluid circulating in the fluid transfer path.

10. The serving tray of claim 1, wherein the one or more first thermoelectric modules and the one or more second thermoelectric modules are configured to simultaneously heat one of the first and second serving surfaces and cool another of the first and second serving surfaces.

11. A method comprising:
    activating one or more first thermoelectric modules in or on a first platform of a serving tray, one or more supply sides of the one or more first thermoelectric modules facing a first serving surface of the first platform;
    activating one or more second thermoelectric modules in or on a second platform of the serving tray, one or more supply sides of the one or more second thermoelectric modules facing a second serving surface of the second platform, a stem extending from the first serving surface of the first platform to a bottom surface of the second platform; and
    circulating a fluid through a fluid transfer path, wherein the fluid transfer path comprises:
       a first flow path inside the first platform;
       a second flow path inside the second platform;
       a third flow path inside the stem and extending between an outlet of the first flow path and an inlet of the second flow path; and
       a fourth flow path inside the stem extending between an outlet of the second flow path and an inlet of the first flow path.

12. The method of claim 11, further comprising:
circulating the fluid in the fluid transfer path using a fluid pump.

13. The method of claim 11, wherein the one or more supply sides of the one or more first thermoelectric modules thermally contact the first serving surface and one or more waste sides of the one or more first thermoelectric modules thermally contact the first flow path.

14. The method of claim 13, wherein the one or more supply sides of the one or more second thermoelectric modules thermally contact the second serving surface and one or more waste sides of the one or more second thermoelectric modules thermally contact the second flow path.

15. The method of claim 11, wherein the first platform further comprises an air duct positioned around the first flow path.

16. The method of claim 15, further comprising:
circulating external air through the air duct using a radial fan positioned in the air duct.

17. The method of claim 16, wherein the air duct comprises a backward curve diffuser positioned around the radial fan.

18. The method of claim 11, further comprising:
reducing a temperature variance within the fluid in the fluid transfer path using a reservoir positioned in fluid transfer path.

19. The method of claim 18, further comprising:
cooling the fluid circulating in the fluid transfer path using a radiator positioned in the fluid transfer path.

20. The method of claim 11, further comprising:
using the one or more first thermoelectric modules and the one or more second thermoelectric modules to simultaneously heat one of the first and second serving surfaces and cool another of the first and second serving surfaces.

* * * * *